United States Patent [19]

Ito

[11] Patent Number: 4,959,684

[45] Date of Patent: Sep. 25, 1990

[54] COPYING MACHINE

[75] Inventor: Hideo Ito, Osaka, Japan

[73] Assignee: Minolta Camera Kabushiki Kaisha, Osaka, Japan

[21] Appl. No.: 360,999

[22] Filed: Jun. 2, 1989

[30] Foreign Application Priority Data

Jun. 6, 1988 [JP] Japan ................................ 63-139191
Jun. 6, 1988 [JP] Japan ................................ 63-139192

[51] Int. Cl.[5] ...................... G03B 27/52; G03G 15/00

[52] U.S. Cl. ........................................ 355/55; 355/56; 355/243

[58] Field of Search .................... 355/55, 56, 243, 233, 355/235

[56] References Cited

U.S. PATENT DOCUMENTS

| | | | |
|---|---|---|---|
| 4,505,579 | 3/1985 | Furuichi | 355/55 |
| 4,650,317 | 3/1987 | Oushiden et al. | 355/243 X |
| 4,740,810 | 4/1988 | Ito | 355/56 |
| 4,789,874 | 12/1988 | Murakami | 355/55 X |

FOREIGN PATENT DOCUMENTS

| | | |
|---|---|---|
| 61-35438 | 2/1986 | Japan . |
| 61-77833 | 4/1986 | Japan . |

*Primary Examiner*—Michael L. Gellner
*Assistant Examiner*—D. Rutledge
*Attorney, Agent, or Firm*—Willian Brinks Olds Hofer Gilson & Lione

[57] ABSTRACT

In a copying machine in which the copying magnification can be set in a longitudinal direction and a lateral direction independently, one or more pair of copy magnification adjusting values in the longitudinal direction and the lateral direction are stored in a memory device. When copy is performed, one of the pair of adjusting values in the longitudinal direction and in the lateral direction is selected based on the information of the kind of the copy paper and the copy magnifications can be automatically adjusted according to the selected adjusting values so that a correct desired sized copy can be obtained.

15 Claims, 20 Drawing Sheets

COPYING MACHINE

BACKGROUND OF THE INVENTION

1. Field of the Invention

The present invention relates to a copying machine, and more particularly to an electronic copying machine being capable of adjusting copying magnifications in a lateral direction and a longitudinal direction independently based on the adjusting values stored in the copying machine and the copying machine is provided with discriminating means for discriminating the kind of papers mounted in a paper feeding unit, whereby the copying magnifications set at the time of making copy are adjusted based on adjusting values which are read out corresponding to the kind of the paper discriminated by the discriminating means.

2. Description of the Related Art

It is noted that the words lateral direction and longitudinal direction in the specification and claims mean the directions of both sides of a right angle of the copying paper and, for example, the longitudinal direction means the direction of the long side of square shaped papers and the lateral direction means the direction of the short side thereof.

Copy magnification in copying machines have specific errors in a lateral direction and a longitudinal direction based on dispersion at the time of production process of the copying machines. The copying papers expand or shrink due to paper quality, the moisture content and condition of the circumstance such as temperature and humidity and the value of the expansion and shrinkage of the paper differs depending on the various conditions mentioned above. Moreover, in the copying process, there is a transfer process in which toner is pressed to a copying paper with heat, wherein the paper size is also changed.

Therefore, it is not easy to really make up a copy of a picture with a correct magnification. Especially, with respect to drawings, size of an article may be measured from a copied drawing. Therefore, in a copying machine for copying drawings, it is requested to make copy with a correct magnification. For this requirement, there is proposed a copying machine in which the copy magnification in the longitudinal and lateral directions are independently adjustable in the Japanese patent publication (unexamined) No. 61-77833.

There are following three main causes of adjusting the copy magnification:

(1) the error being proper in the copying machine;

(2) change of the copying magnification due to change of the original;

(3) natural expansion or shrinkage of the copying paper or correction against the size change of the copying paper in the copying process.

In the above, change of the copying paper is the most important cause.

Conventionally, however, the copy magnification is manually adjusted considering the above three major causes as one unseparated cause. Therefore, according to the conventional copying machine, such adjustment must be made every copy. In addition since the copy magnification is adjusted by comparing the copied picture with the original picture, it is necessary to repeat the adjustment of the copy magnification several times until the copy with the desired copy magnification can be obtained. Therefore, not only copy paper but also time are wasted and it is required to improve the operability of the copying machine.

Besides, as to the copying papers used in the copying machine, the rate of the expansion and shrinkage of the copy paper itself and the rate of the expansion and shrinkage of the copy paper in the copy process in the longitudinal direction and the lateral direction are substantially constant if the kind of copy paper is unchanged, whereby in case copy papers of the same kind are used, it is not necessary to repeat the adjustment of the copy magnification once the copy magnification is adjusted.

SUMMARY OF THE INVENTION

It is an essential object of the present invention to provide a copying machine in which the copy magnifications in the longitudinal direction and lateral direction are independently adjustable and the adjusting values ar selected corresponding to the kind of the copying papers used for copy, whereby the copying magnification is adjusted by the selected adjusting value.

According to the present invention, there is provided a copying machine comprising:

image forming means for forming an image of an original to be copied on a copying paper;

magnifying means for setting copy magnifications in a longitudinal direction and a lateral direction independently;

first selecting means for selecting any one of the copy magnifications preliminarily stored;

first magnification control means for controlling said magnifying means so that the copy of the original has such magnifications in the longitudinal and lateral directions as selected by said first selecting means;

a plurality of memory means each comprising memory areas for storing a pair of adjusting values for adjusting the copy magnifications, the pair of adjusting values being a first adjusting value in the longitudinal direction and a second adjusting value in the lateral direction;

second selecting means for selecting one of said memory means;

second magnification control means for controlling said magnifying means based on the pair of adjusting values stored in said selected memory means and the copy magnifications selected by said first selecting means.

In the arrangement mentioned above, the copy magnification in the longitudinal direction is set based on the copy magnification selected by said first selecting means and the first adjusting value and the copy magnification in the lateral direction is set based on the copy magnification selected by said first selecting means and the second adjusting value.

DETAILED DESCRIPTION OF THE PREFERRED EMBODIMENTS

Figure 1:
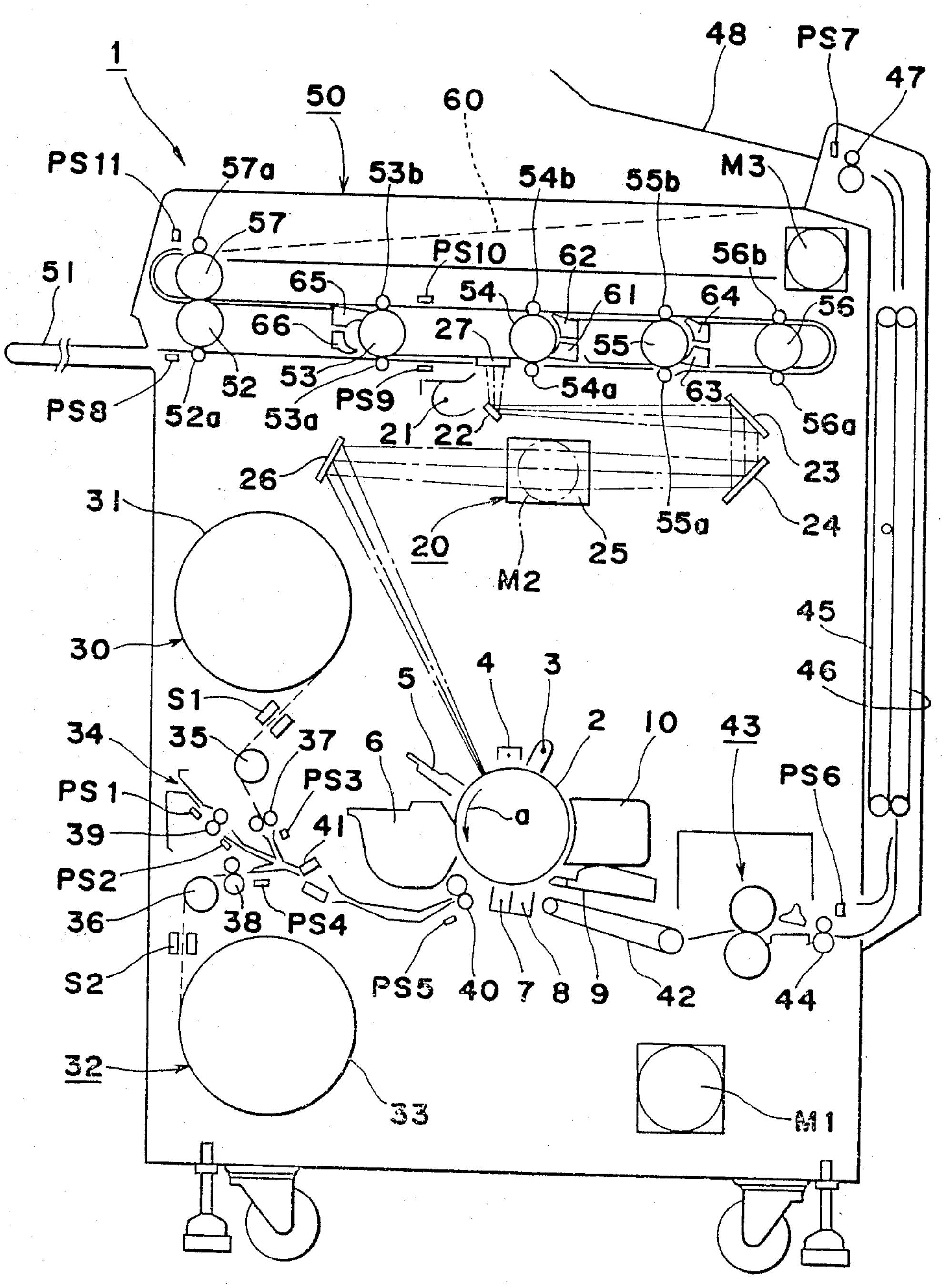
FIG. 1 is a cross sectional view showing the inside of an example of a copying machine used in the present invention.

Referring to FIG. 1, a copying machine body 1 has its central portion provided with a photosensitive drum 2 which is rotatable in the direction indicated by arrow mark a and around the photosensitive drum 2 there are provided a main eraser lamp 3, an electric charger 4, an sub-eraser lamp 5, a developing unit 6 of a magnetic brush type, a transfer charger 7, a paper separation, charger 8, a separation tip 9, and a cleaning device 10 of a blade type.

An optical system 20 comprises an exposure lamp 21, mirrors 22, 23 and 24, a lens 25 and a mirror 26. The optical system 10 can focus the image of an original for copy on the surface of the photosensitive drum 2. The original is moved along an original slit glass 27 by an original transfer and circulating device 50 which is explained in detail later. The lens 25 and mirror 26 can be moved in a direction of the light axis of the lens corresponding to the copying magnification by a stepping motor M2. The position of the len can be set so that the copy magnification n and the fine adjusting magnification factor ny is changed to the copy magnification $n(1+ny)$.

The photosensitive drum 2 is operated in such a manner that the residual electric charges can be eliminated by the main eraser lamp 3 in every copy then the electric charges are given by the charger 4, the original image is focused on the surface of the drum 2 by the optical system 20 and latent charges of the image of the original are formed. The latent charges are transformed into a toner image of the original by the developing device 6.

On the other hand, a paper feeding unit is composed by an upper paper feeding unit 30 in which one of paper rolls 31 and 33 can be selectively mounted, a lower paper feeding unit 32 and a manual paper feeding unit 34 for feeding cut papers. The roll papers 31 and 33 are respectively drawn from paper feeding rollers 37 and 38 through the rollers 35 and 36 and fed up to a pair of timing rollers 40 being guided by various paper guide members and the paper stops at the timing rollers for waiting.

A timing roller 40 is rotated by predetermined timing signals, whereby each copy paper is copied with the toner picture by the discharge of the transfer charger 7 and separated from the photosensitive drum 2 by the AC discharge by the separation charger 8. The timing signals are generated at the timings when the leading end of the picture formed on the photosensitive drum 2 in the transfer unit and the end of the copy paper synchronize. The rolled papers 31 and 33 are cut into a lateral formal size or a longitudinal formal size based on the roll size and the size of the original by a cutter 41. After the transfer of the picture, the copied papers are fed to a fixed device 43 through a transport belt 42 which is provided with an air suction unit (not shown). At the fixed device, the copied paper is subjected to the fixing of the toner and subsequently the copied paper is discharged out of the copying machine body 1 by a first discharge roller 44.

Moreover, the copied papers are carried vertically up by belts 45 and 46, in turn discharged on a discharge tray 48 by second rollers 47.

The photosensitive drum 2, paper feeding unit and paper carrying unit are respectively driven by a main motor M1.

S1 and S2 denote respectively paper discriminating sensors for discriminating the kind of papers and each of the discriminating sensors comprises a light emitting unit and a light receiving unit disposed on both sides of the roll papers 31 and 33 drawn from the rollers 37 and 38. The discriminating sensors S1 and S2 discriminate the kind of papers such as the normal papers and, tracing papers by the light value passed through the papers. The discriminating signals obtained by the discriminating sensors S1 and S2 act to change the fixing temperature corresponding to the kind of the paper, that is the discriminating signals are used as the control signal for the stabilized fixing.

There are disposed a plurality of sensors PS1 to PS7 along the paper carrying path between the paper feeding units and paper discharging tray 48 so as to monitor whether the papers fed and discharged pass normally through the paper carrying path.

In FIG. 1, an automatic original feeding and circulating device (referred to as RADF hereinafter) 50 is composed by an original platform 51, a plurality of original carrying rollers 52 to 57, an original discharging tray 60 and an original carrying motor M3.

The original carrying rollers 52 to 57 comprise follower rollers 52*a*, 53*a*, . . . 57*a* respectively and a guide member is disposed around the original carrying rollers so as to carry the original. The original carrying rollers 54 and 55 are provided with guide plates 62 and 64 and switching tips 61 and 63 respectively for switching the original carrying path and the original carrying roller 53 is provided with a guide plate 66 and a switching tip 65 for switching circulation and discharge of the original.

In the arrangement mentioned above, when the switching tip 61 is entered in the carrying path with the switching tip 65 entered into the carrying path, the original is circulated between the carrying rollers 53 and 54. In case the switching tip 63 is entered into the path in place of the switching tip 61 the original is circulated between the carrying rollers 53 and 55. In case the switching rollers 61 and 63 are retracted from the carrying path, the original is circulated between the switching rollers 53 and 56. With the switching tip 65 retracted from the carrying path, the original is discharged to the discharge tray 60 from the original carrying roller 57.

The respective rollers 52 to 57 are driven to rotate by the original carrying motor M3 and assuming the carrying speed V for the equivalent size copy, the carrying speed is controlled at $V/n(1+\Delta n_r)$ for the magnified copy with the copy magnification n and a adjustment value $\Delta n_r$ for the adjustment in the longitudinal direction. The carrying speed V of the original is equal to the circumferential speed of the photosensitive drum 2 and the paper feeding speed.

Figure 2:
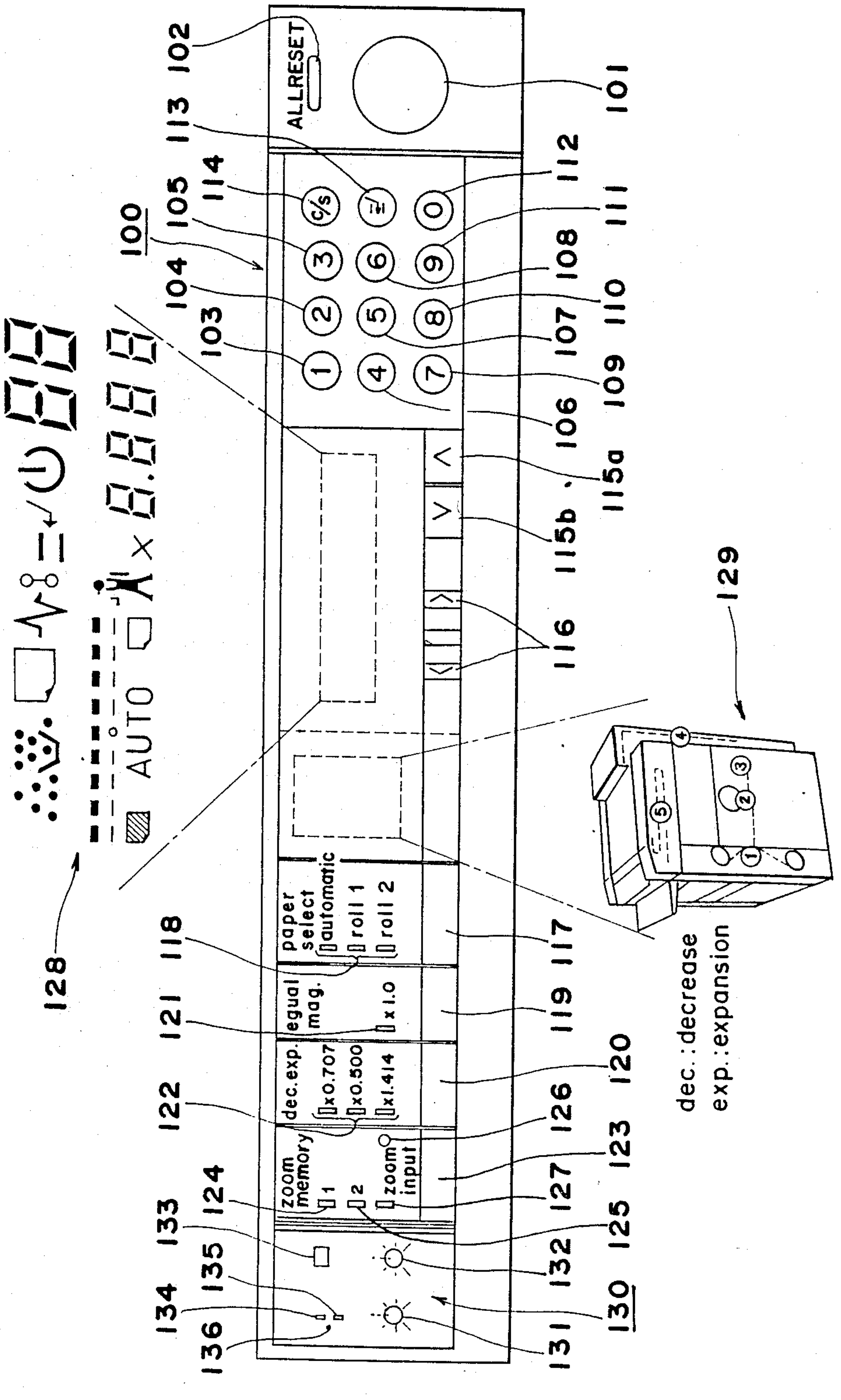
FIG. 2 is a top plan view showing an example of an operation panel used in the copying machine according to the present invention.

FIG. 2 shows an arrangement of the respective operation keys on an operation panel 100 of the copying machine.

Figure 3:
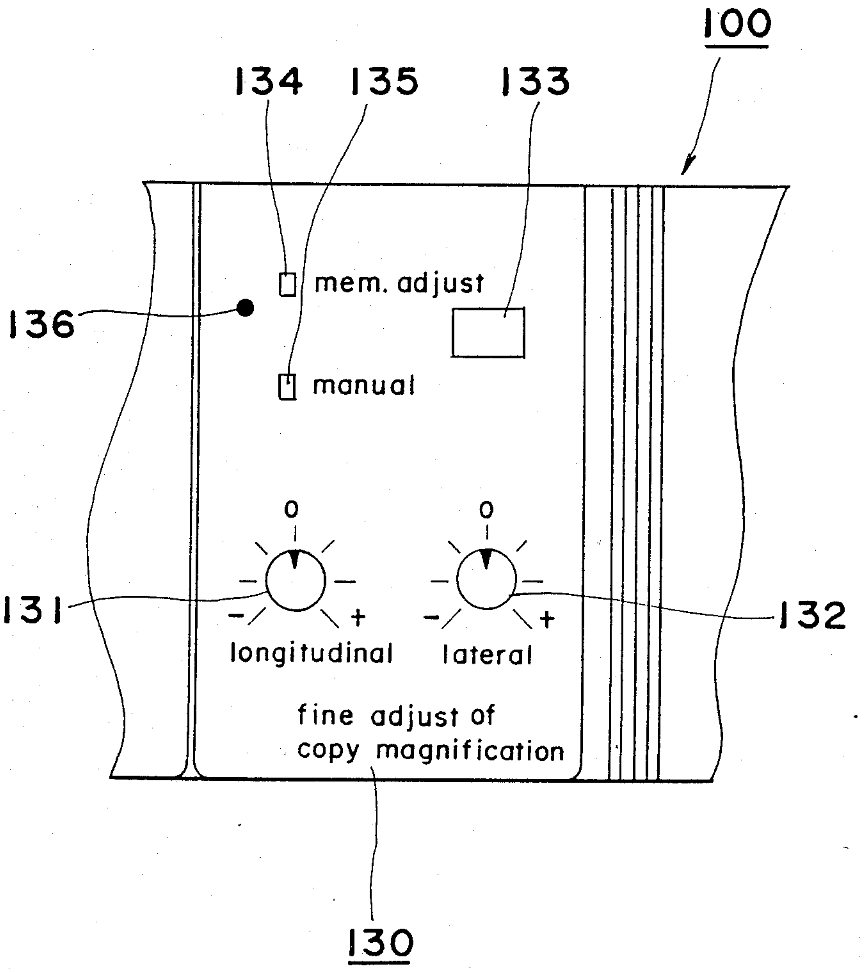
FIG. 3 is an enlarged top plan view of an operation unit 130 for adjusting longitudinal and lateral copy magnifications, FIGS. 4(*a*) and 4(*b*) are circuit diagrams of a control circuit used for the copying machine shown in FIG. 1.

There are provided on the panel 100 an emergency stop key 101 for stopping the original carried in emergency, an all reset key 102 for resetting all of the operation keys on the operation panel 100, ten keys 103 to 112 corresponding to the numeric values 1, 2, 3 . . . 9 and 0, an interruption key 113 for ordering an interruption copy, a clear stop key 114, a zoom up key 115*a*, a zoom down key 115*b*, an exposure key 116 for designating to change the concentration of the copied picture manually stepwise, a paper selection key 117 for selecting any one of the automatic paper selection, the upper paper feeding port and the lower paper feeding port in a rotating manner with its display LED (light emitting diode) 118 for displaying them, magnification selecting keys 119 and 120 for selecting any one of equivalent size copy and fixed decrement copy and their display 121 and 122, a zoom selection key 123 for selecting a first zoom memory and a second zoom memory and for storing optional copy magnification and their display 124 and 125, a zoom input key 126 for enabling to input the optional copy magnification and its display 127, a display unit 128 made of one or more fluorescent display tubes for displaying the number of copy and copy magnification value in numeric characters and for displaying a machine condition or the like by illustration and a jam monitor 129 for displaying jammed position of the original and copy paper. The panel 100 further comprises a copy magnification fine adjusting unit 130 (referred to a adjusting unit) which is shown in FIG. 3 in detail for adjusting the fine copy magnifications in the longitudinal direction and the lateral direction.

In the adjusting unit 130, there are disposed a knob 131 for operating a variable resistance for adjusting the fine copy magnification in the longitudinal direction and a knob 132 for operating a variable resistance for adjusting fine copy magnification in the lateral direction, a selection key 133 for selecting a fine magnification adjusting mode (memory correction, manual) in a rotating manner and their display units 134 and 135. The adjusting unit 130 further comprises a memory input switch 136 for inputting the fine adjusting value obtained by operating the knobs 131 and 132.

Figure 4A:
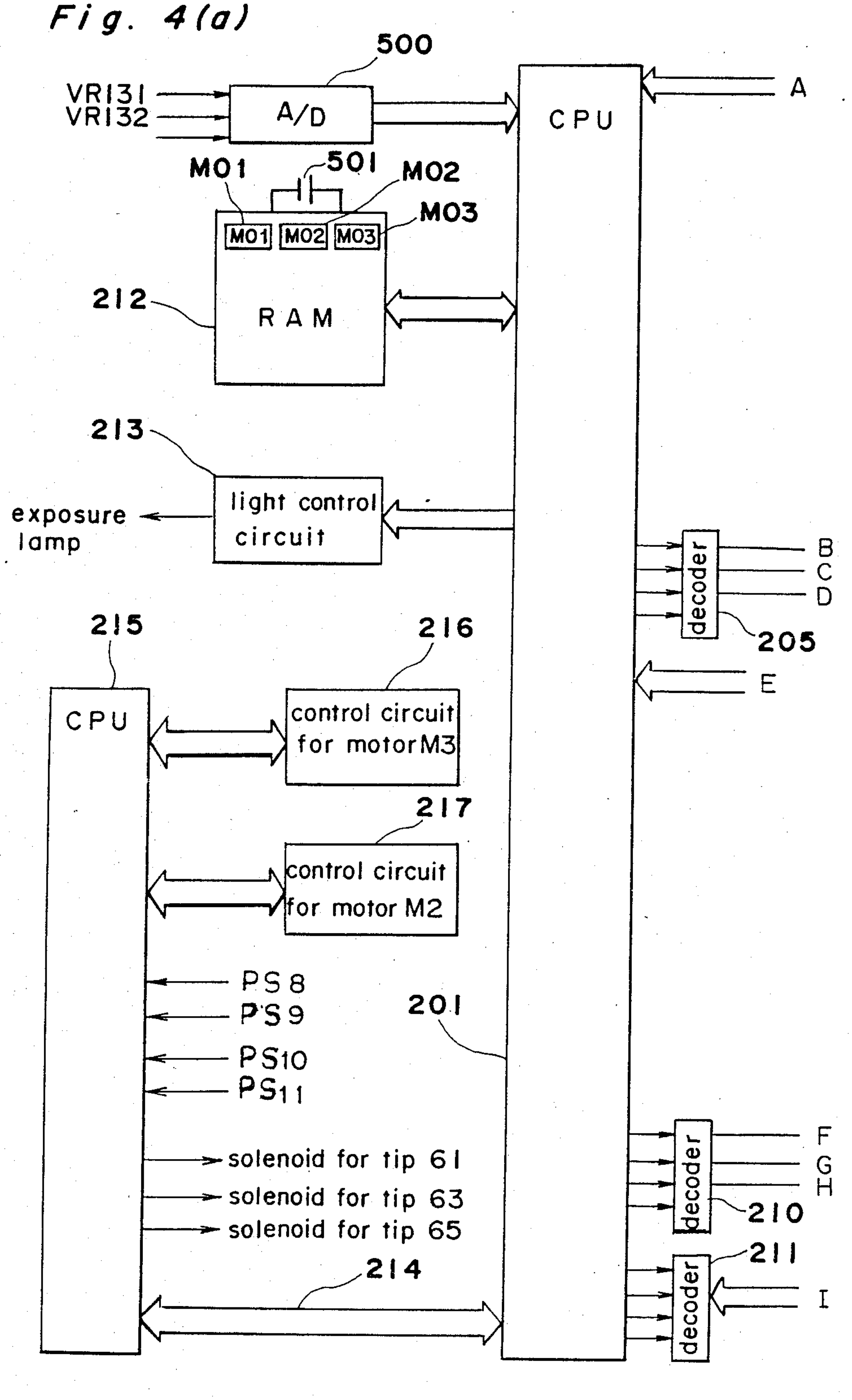
Figure 4B:
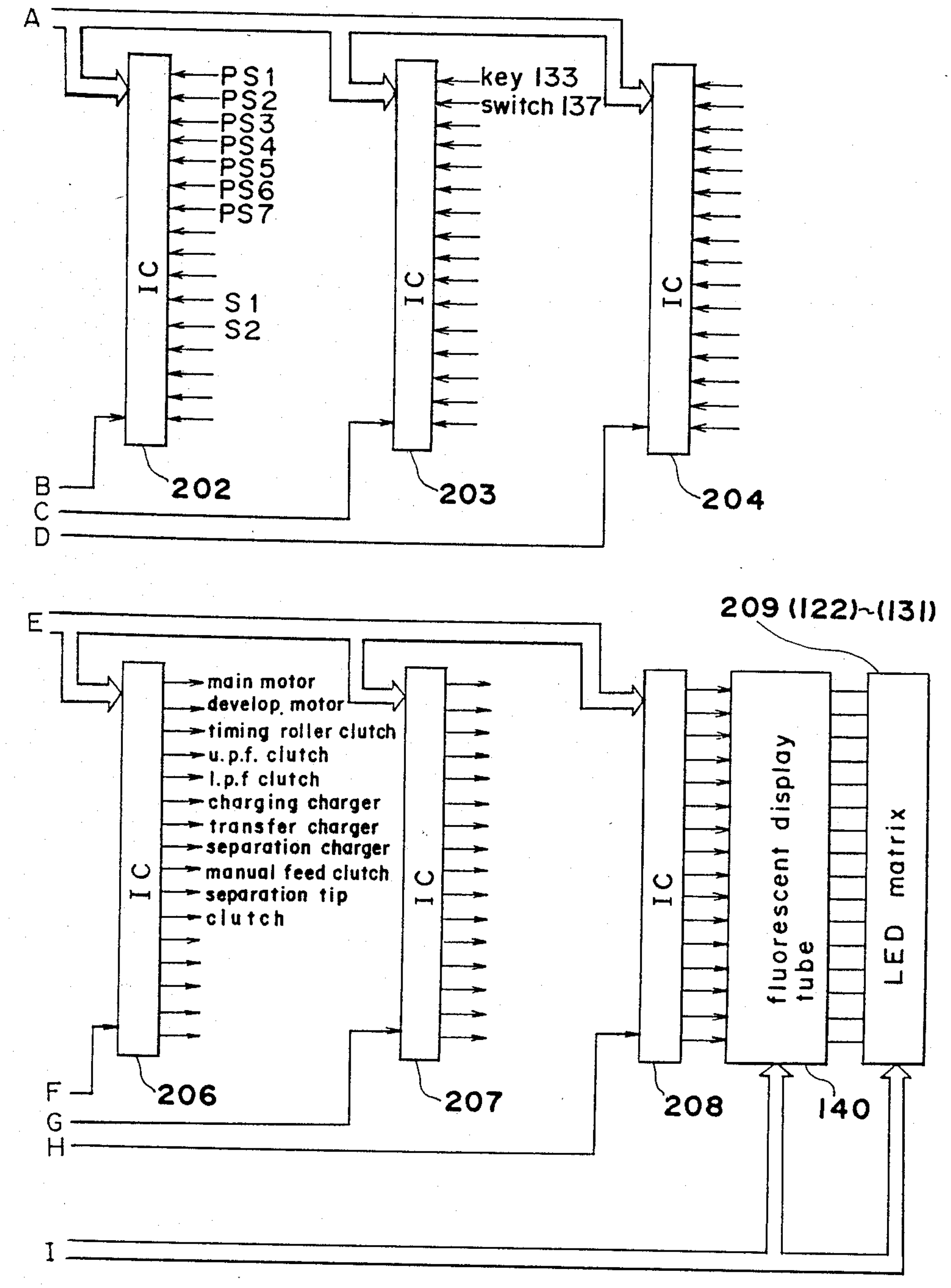

FIGS. 4(*a*) and 4(*b*) show an input and output arrangement of a first CPU 201 made of a microprocessor for controlling the copying machine 1 and a second CPU 215 made of a microprocessor for controlling the RADF 50 and the optical system 20.

The first CPU 201 comprises integrated circuits (IC) 202 to 204 and 206 to 208 for extension of the inputs and outputs. The ICs 202 to 204 are used as the input ICs and coupled with the first CPU 201 by a decoder 205 through data lines. The input terminals are connected with various keys, switch and sensors. ICs 206 to 208 are used as the output ICs and the control board is coupled with the first CPU 201 through a decoder 210. The output terminals are connected with a display unit 140 by fluorescent display tubes and LED matrix 209 formed by the LEDs 122 to 131 in addition to various components, whereby they are controlled by the first CPU 201 through a decoder 211. The input analog signals from the longitudinal and lateral adjusting variable resistors VR131 and VR132 operated by the knobs 131 and 132 and analog sensors (not shown) are converted into digital signals by a A/D converter 500, in turn input to the first CPU 201. A RAM (random access memory) 212 comprises memories M01 and M02 for storing two kinds of the correction magnifications and memory M03 for storing the fixed copy magnifications. The RAM 212 is connected to the first CPU 201 and is backed up by a battery 501.

The first CPU 201 feeds data of selected one of 9 exposure values to a light control circuit 213.

The input and output ports of the second CPU 215 are coupled to a control circuit 216 for controlling the original carrying motor M3 of the RADF 50 and a control circuit 217 for controlling the motor M2 for moving the lens 25 and mirror 26 corresponding to the selected copy magnification. The on and off signals from the sensor PS8 to PS11 in the RADF 50 are input to the second CPU 215, which also outputs on and off signals for operating solenoids for driving the switching tips 61, 63 and 65. The second CPU 215 is coupled with the first CPU 201 so as to communicate with the with the CPU 201 through a bus 214.

Operation of the copying machine 1 is explained with reference to a flow chart shown in FIG. 5.

Figure 5:
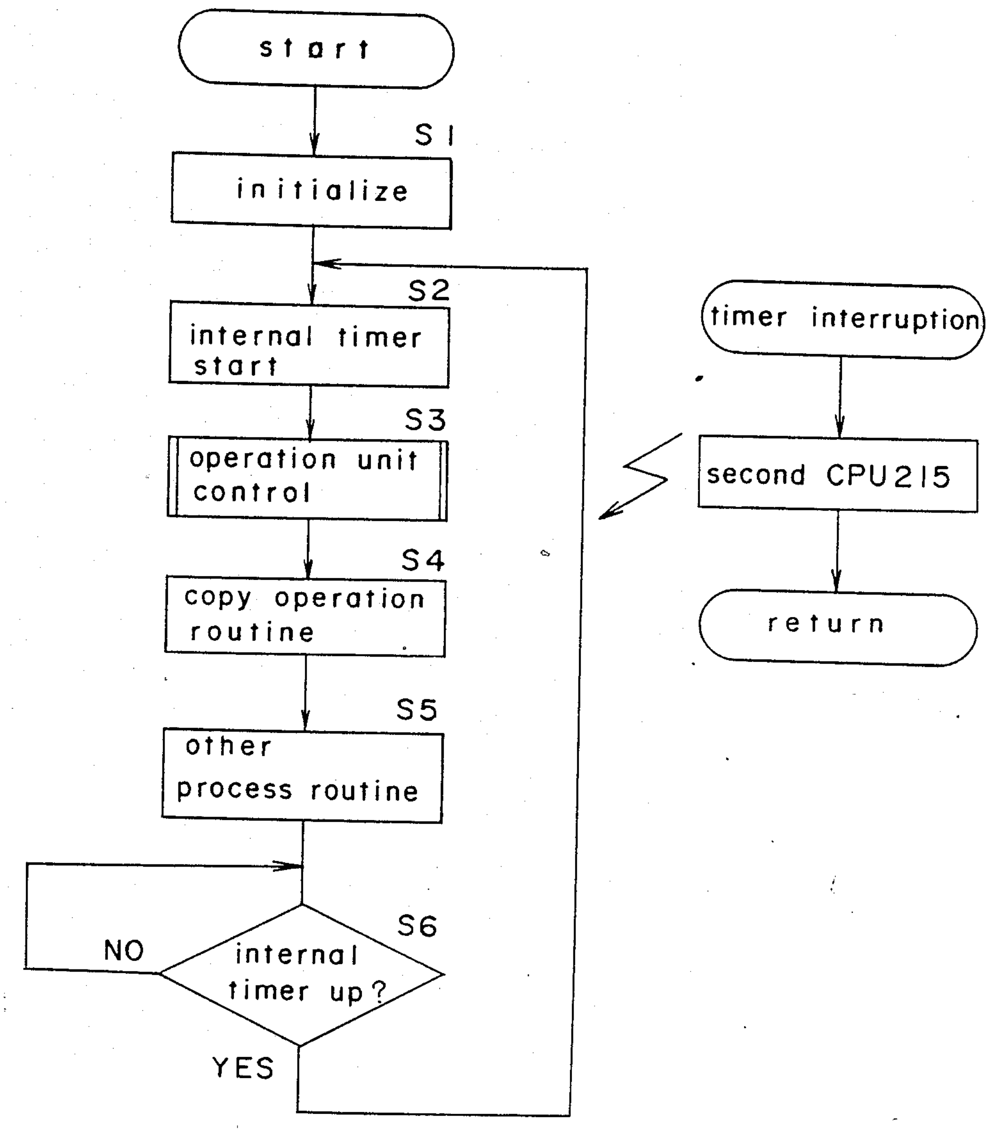
FIG. 5 is a flow chart of a main routine and a timer interrupt routine.

FIG. 5 is a flow chart showing the main routine and timer interruption in the control process in the first CPU 201.

Referring to FIG. 5, when the electric power is supplied to the copying machine 1 in the step S1, the first CPU 201 is initialized.

In the step S2, an internal timer is set and 1 routine time is set for performing the processes mentioned hereinafter. In the steps S3 and S4, an operation unit control routine and a copy operation routine are performed. The operation unit control routine will be described in detail later.

In the step S5, other routines are performed and in the step S6, it is judged whether the time set in the internal timer in the step S2 is up and if the time is up, the process goes to the step S2 again, while if the time is not up, the program waits.

The timer interruption is used for communication with the second CPU 215 and performed with the time interval set in the initial step S1. In the timer interruption, an interruption for requesting communication with the second CPU 215 is performed, subsequently the first CPU 201 sends the data necessary for the second CPU 215 such as the data of magnification in the longitudinal direction and lateral direction and receives data from the second CP 215.

Figure 6:
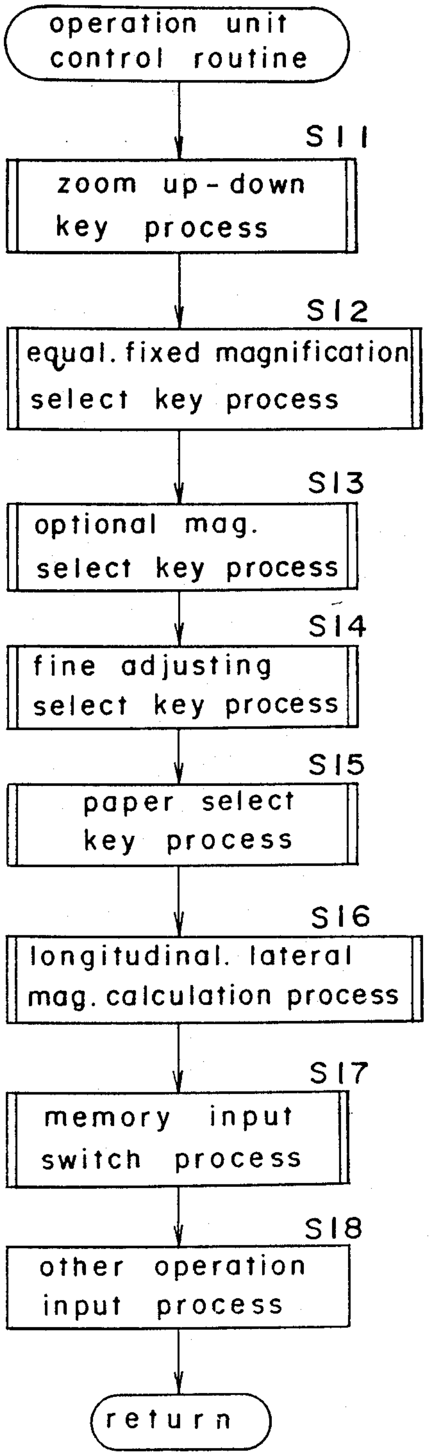
FIG. 6 is a flow chart of a control routine of an operation unit.

FIG. 6 is a flow chart showing the operation unit control routine.

There are performed the zoom up down key process routing in the step S11, the equal magnification and fixed magnification selection routine in the step S12, the optional magnification selecting key process routine in the step S13, magnification fine adjusting selection key process routine in the step S14, the paper selection key process routine in the step S15, the copy magnifications in the longitudinal direction and the lateral direction calculating process routine in the step S16, and the memory input switch process routine in the step S17. The details thereof will be described later.

In the step S18, other operation input routines are performed so as to perform key inputs of the original stop key, ten keys and other various keys and switch inputs, display by the key inputs and the switch inputs and a mode control due to the key inputs and control in the copying operations.

Figure 7:
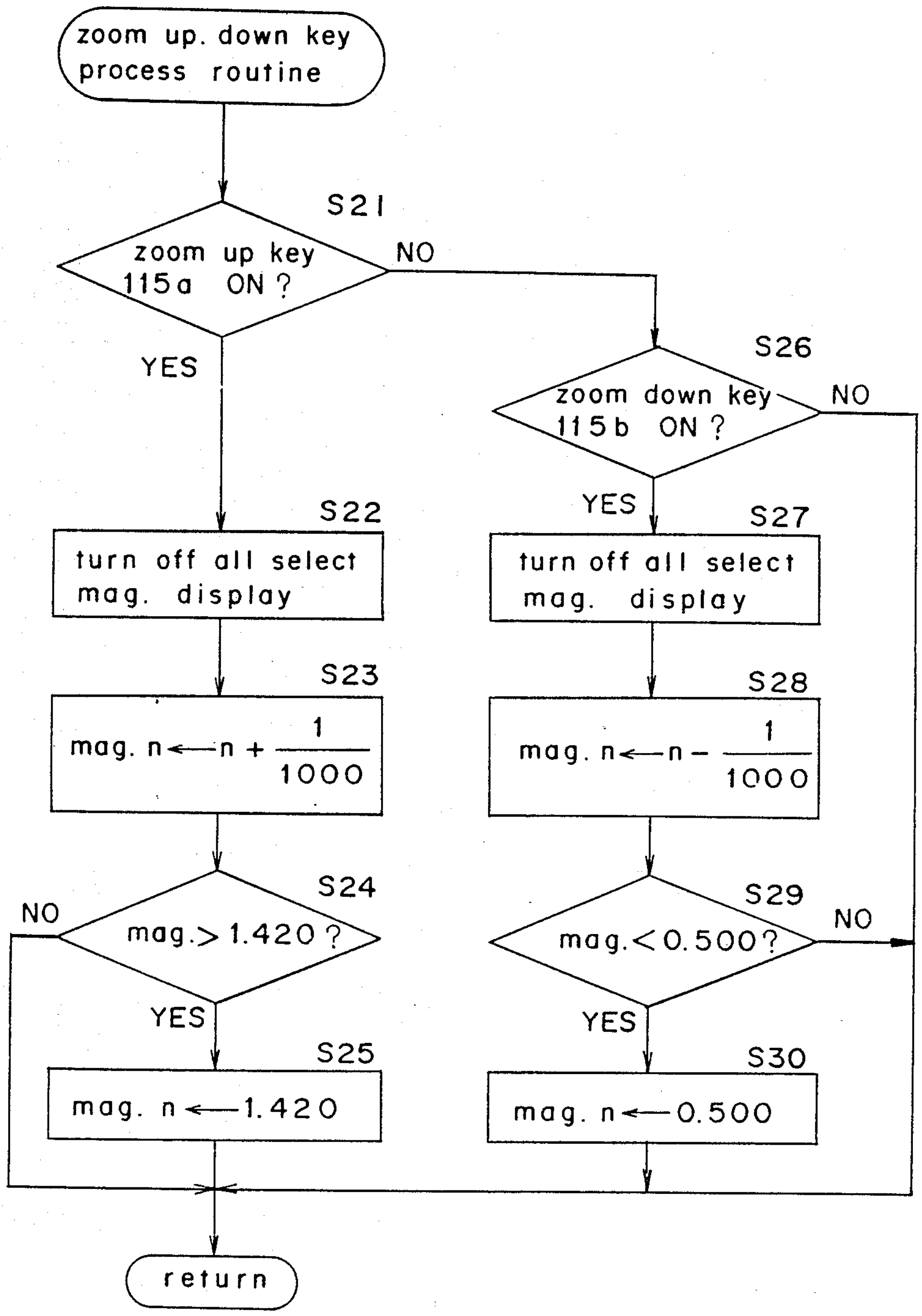
FIG. 7 is a flow chart of a zoom up and down key process routine.
Figure 8:
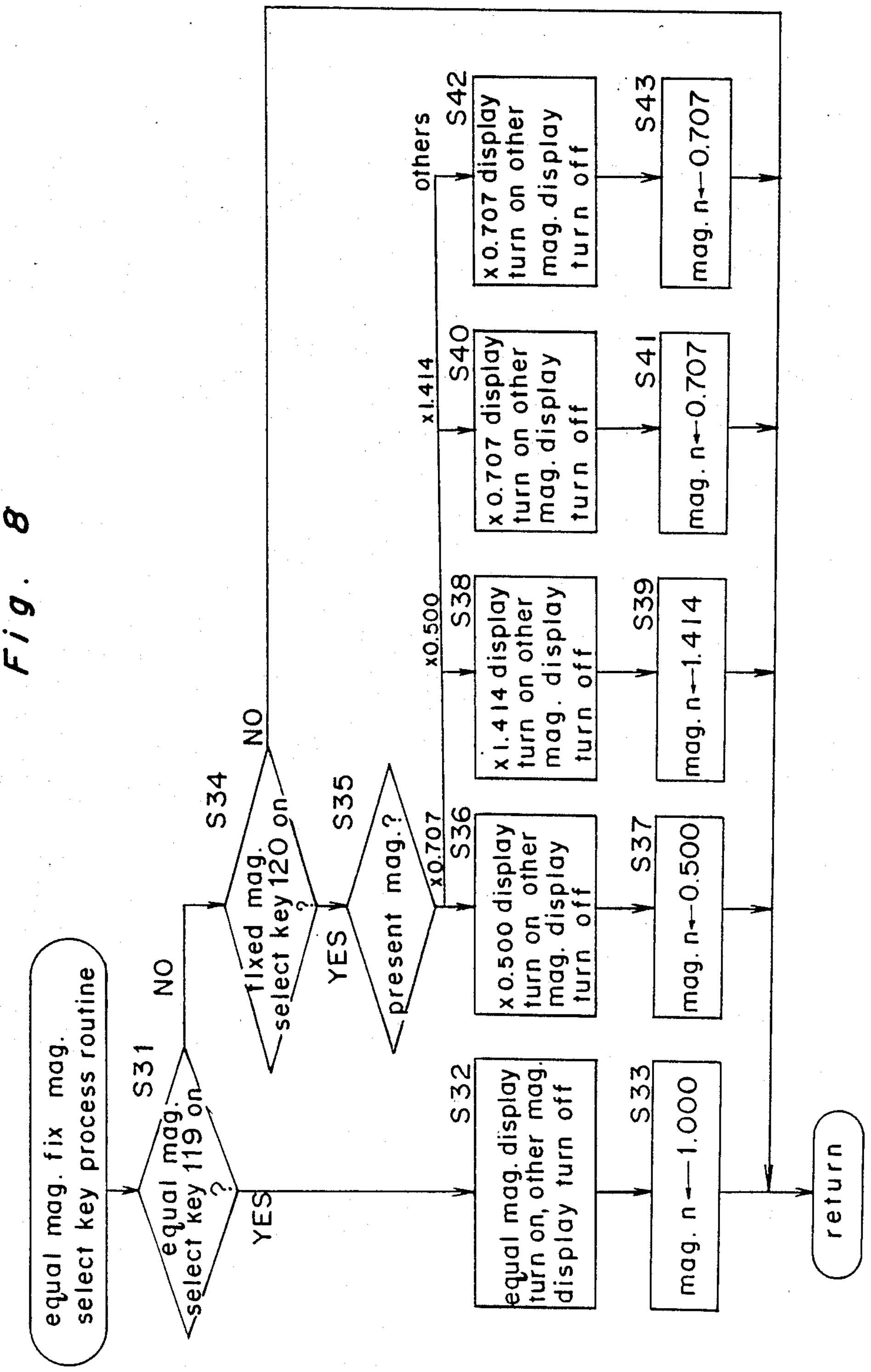
FIG. 8 is a flow chart of an equivalent and fixed copying magnification process routine.

FIG. 7 is a flow chart showing the zoom up and down key process routine.

In the step S21, it is judged whether or not the zoom up key 115*a* is turned on and if turned on, the program goes to the steps S22 to S25 for turning off the display of the selected copy magnifications such as the equal magnification copy and fixed copy magnification, and every time the zoom up key 115*a* is operated that is the result of the judgement is YES, the copy magnification n is sequentially increased by 1/1,000, performing the optional magnification input. It is noted that the upper limit of the copy magnification is set by 1.420.

In case the result of the judgement in the step S21 is NO, it is judged in the step S26 whether or not the zoom down key 115*b* is operated, if the key 115*b* is operated, with YES, the program goes to the steps S27 to S30, all of the display of the selected magnification are turned off and every time the zoom down key 115*b* is operated, the copy magnification n is decreased by 1/1,000 to input the optional copy magnification and the lower limit of the magnification is set 0.500.

In the step S31, it is judged whether or not the equal magnification selection key 119 is turned on, if turned on, with YES, the program goes to the steps S32 and S33, wherein the equal magnification display 121 is turned on with the other display 122 turned off and the magnification n is set 1.000.

In case the result of the judgement in the step S31 is NO, the Program goes to the step S34, wherein it is judged whether or not the fixed magnification selecting key 120 is turned on, if turned on, it is detected the presently set copy magnification in the step S35. If the copy magnification is set 0.707 times, the copy magnification is up dated by 0.500 times, if 0.500 times is already selected, the copy magnification is set 1.414 times and if 1.414 times is already selected, the copy magnification is set by 0.707 times in the rotation manner, whereby the desired magnification is displayed with the other copy magnification turned off in the steps S36 to S41. On the other hand, if none of the copy magnifications mentioned above is selected, for example, if the optional copy magnification is selected by the zoom up and down key, the copy magnification is set 0.707 times thereby the copy magnification is displayed in the steps S42 and S43.

Figure 9:
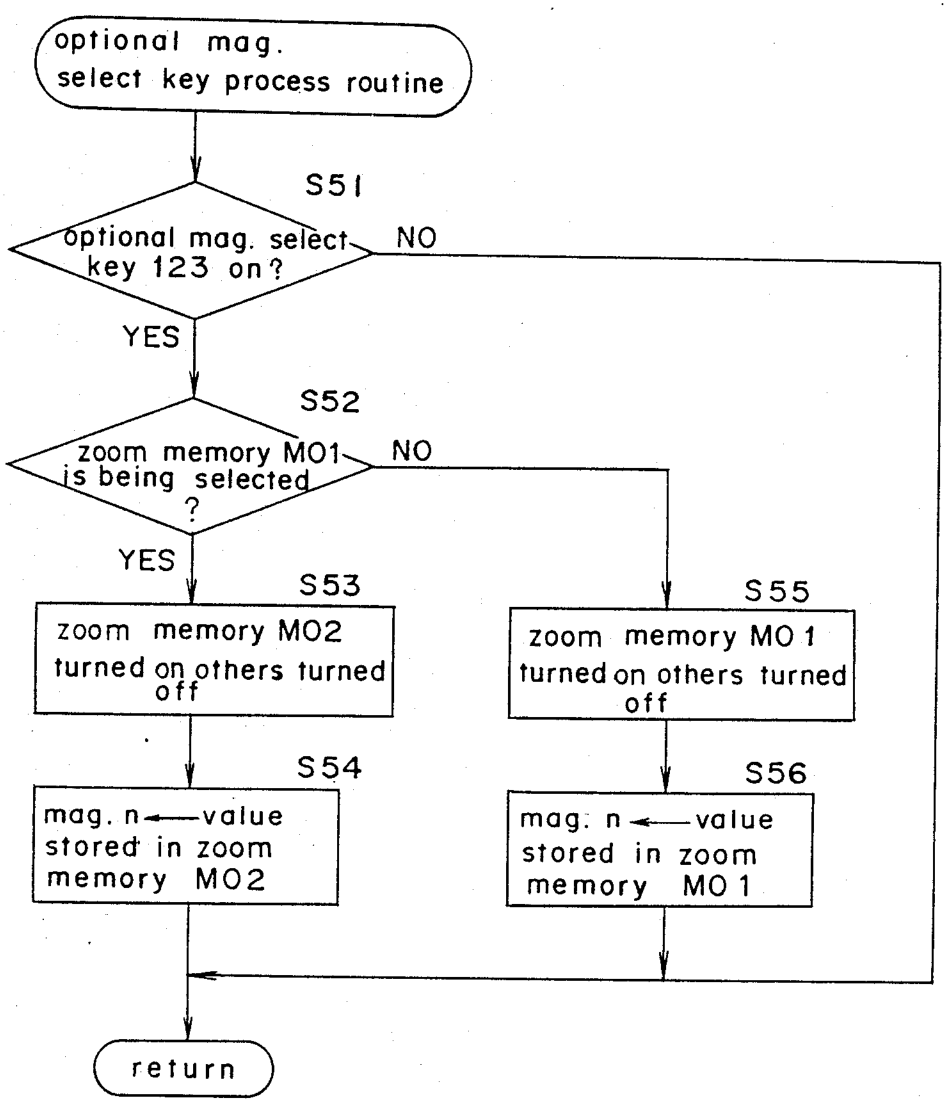
FIG. 9 is a flow chart of an optional copy magnification selection key process routine.

FIG. 9 is a flow chart showing the optional copy magnification selection key processing routine.

In the step S51, it is judged whether or not the optional copy magnification selection key 123 is turned on, if turned on, with YES, the program goes to the step S52 to judge the zoom memory M01 is in the selection process, with YES, the display unit 125 for the zoom memory M02 is turned on, turning off other display units 124 and 127 setting the memory value of the zoom memory M02 into that value in the steps S53 and S54. In case of NO in the step S52, the display unit 124 of the zoom memory M01 is turned on, turning off the other display units 125 and 127, setting the memory value of the zoom memory M01 into that copy magnification in the steps S55 and S56.

Figure 10A:
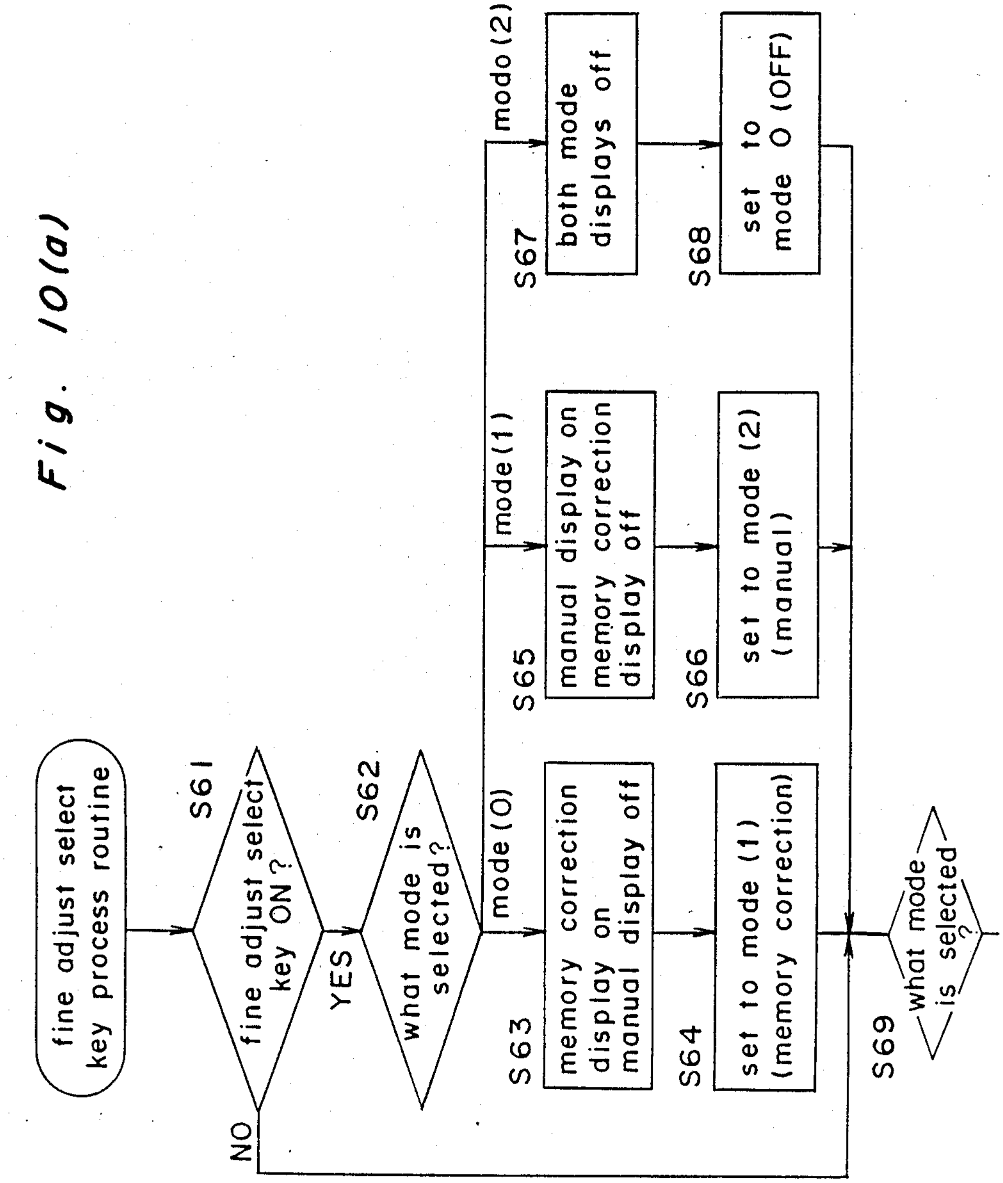
FIGS. 10(*a*) and 10(*b*) are a flow chart of a fine adjust select key process routine.
Figure 10B:
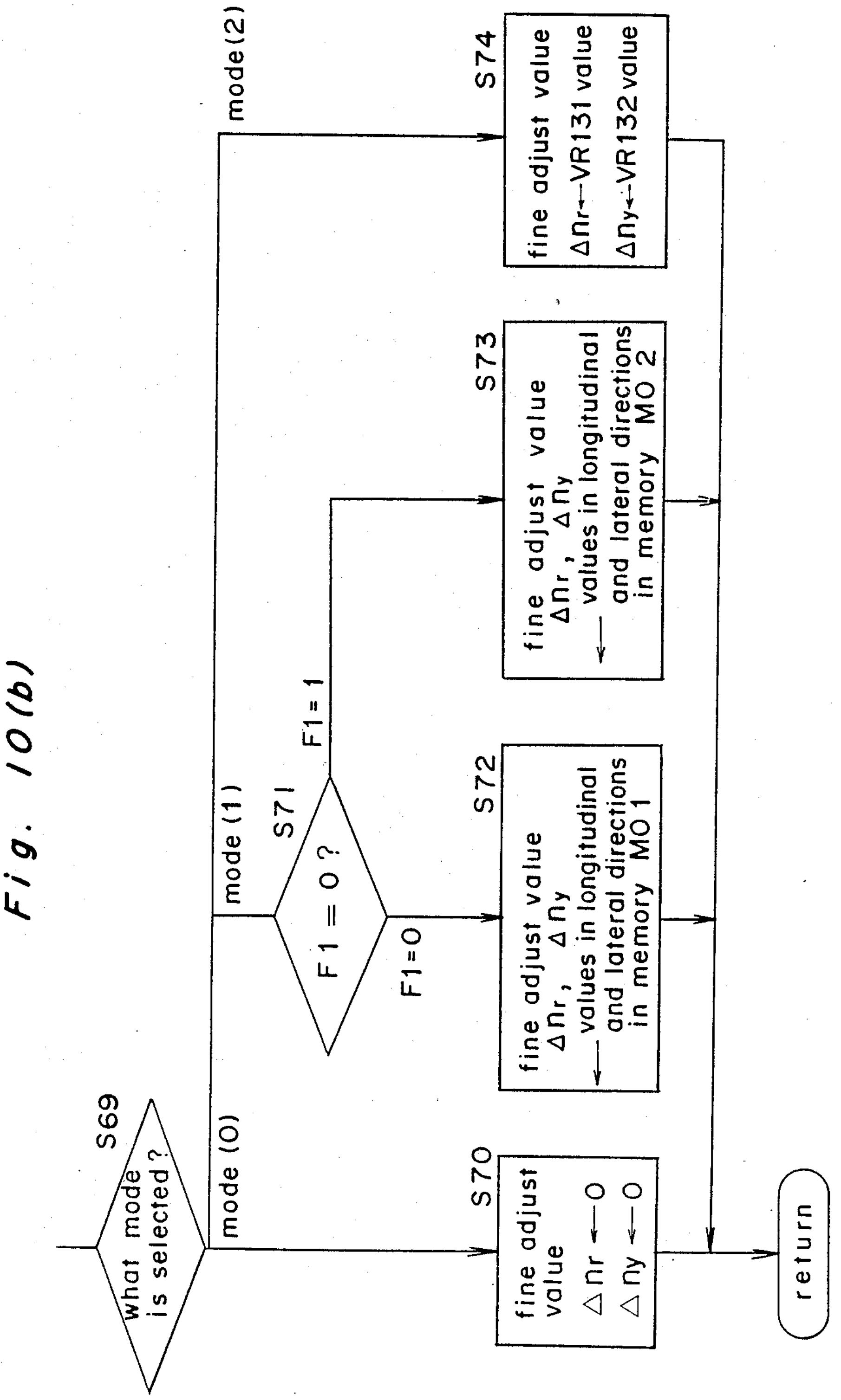

FIGS. 10(*a*) and 10(*b*) are a flow chart showing the copy magnification fine adjusting selection key process routine.

In the step S61, it is judged whether or not the selection key 133 is turned on, if turned on, with YES, the program goes to the step S62 to judge the mode during selection. In this mode, there are OFF mode, memory correction selection mode and manual selection mode in the turn of 0 to 2. Any one of the modes can be selected by turning on the selection key 133 in the rotation manner. Specifically, if the mode is (0), the memory correction display 134 is turned on, turning off the manual display 135 in the step S63, then the program goes to the step S64 to set the mode (1) which is the memory correction selection mode. In case the mode (1) is already set, the manual display 135 is turned on in the step S65, turning off the memory correction display 134 and the program goes to the step S66 to set the mode (2) which is the manual selection mode. In case the mode (2) is already set, both of the mode displays are turned off in the step S67 and mode (0) (OFF mode) is set in the step S68. After the mode is set, the program goes to the step S69 to detect the content of the set mode.

In case it is judged in the step S69 that the mode (0) is set, the program goes to the step S70, wherein the longitudinal and lateral direction magnification fine adjusting values $\Delta n_r$, $\Delta n_y$ are made 0. In case the mode (1) is set, it is judged in the step S71 whether or not the flag F1 is set.

The flag F1 is set by the paper selection key process routine.

In case the flag F1 is [0], program goes to the step S72 wherein as the adjusting values $\Delta n_r$, $\Delta n_y$ of the magnifications in the longitudinal and lateral directions, the values stored in the memory M01 are set. In case the flag F1 is [1], the program goes to the step S73 wherein as the values $\Delta n_r$, $\Delta n_y$, the values stored in the memory M02 are set. In case of mode (2), the program goes to the step S73 wherein as the values $\Delta n_r$, $\Delta n_y$, the values obtained by the operation of the valuable resisters VR131 and VR132 are set.

Figure 11:
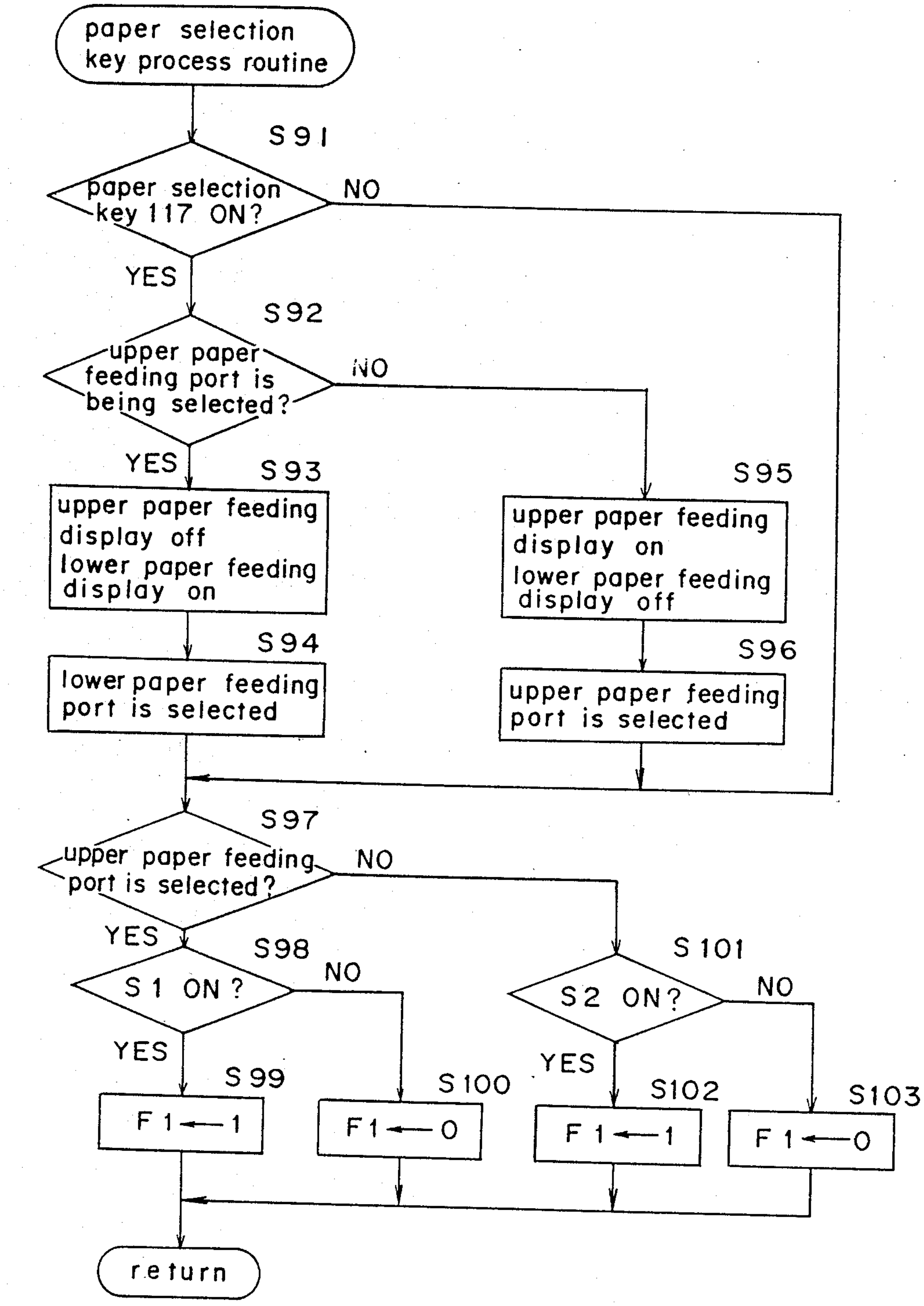
FIG. 11 is a flow chart of a paper selecting key process routine.

FIG. 11 is a flow chart showing the paper selection key process routine.

In the step S91, it is judged whether or not the paper selection key 117 is turned on, if turned on with YES, the program goes to the step S92, wherein it is judged whether or not the upper paper feeding port is selected. If the upper paper feeding port is selected, with YES, the program goes to the steps S93 and S94, the upper paper feeding port display is turned off, with the lower paper feeding port display turned on and the lower paper feeding port is selected, then the program goes to the step S97. If the judgement in the step S92 is NO, the program goes to the steps S95 and S96 wherein the upper paper feeding port display is turned on with the lower paper feeding port display turned off, the upper paper feeding port is selected and the program goes to the step S97. In the step S97, it is judged whether or not the upper paper feeding port is selected. If the upper paper feeding port is already selected, the program goes to the step S98 wherein it is judged whether or not the sensor S1 for detecting the kind of the paper is turned on. If turned on, with YES, the program goes to the step S99 to set the flag F1 to [1]. If the judgement in the step S98 is NO, the program goes to the step S100 wherein the flag F1 is reset to [0]. In the step S97 if the judgement is NO, the program goes to the step S101 wherein it is judged whether or not the sensor S2 is turned on, if turned on, with YES, the program goes to the step S102 to set the flag F1 [1], on the other hand, if the judgement in the step S101 is NO, the program goes to the step S103 to reset the flag F1 to [0].

Figure 12:
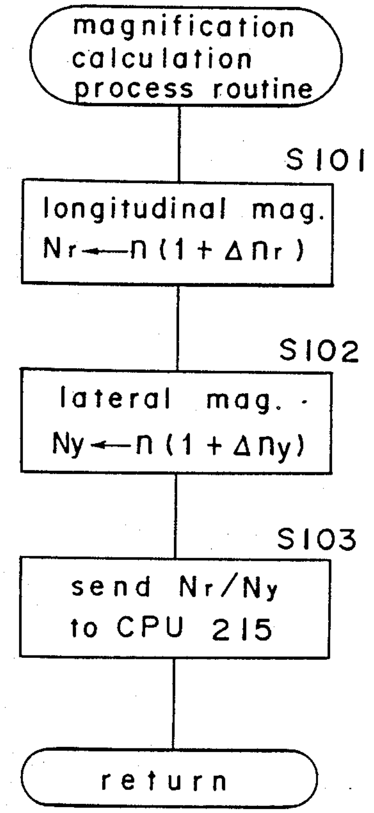
FIG. 12 is a flow chart of a longitudinal and lateral copy magnification calculating routine.

FIG. 12 is a flow chart showing the longitudinal and lateral direction magnification calculating process routine.

In that routine, in the steps S101 and S102, the selected magnification n is modified by the fine adjusting values $\Delta n_r$ and $\Delta n_y$ to obtain the adjusted longitudinal copy magnification $N_r$ and the adjusted lateral copy magnification $N_y$, which are sent to the second CPU 215 in the step S103.

The value n may be such a value that is selected by the zoom up key 115*a*, zoom down key 115*b*, the equal magnification selection key 119, the fixed magnification selection key 120 or the optional magnification selection key 123. The fine adjusting values $\Delta n_r$ and $\Delta n_y$ are such values that are read from the memories M01 or M02 by the operation of the selection key 131 or set by the variable resistors VR131 and VR132.

Figure 13:
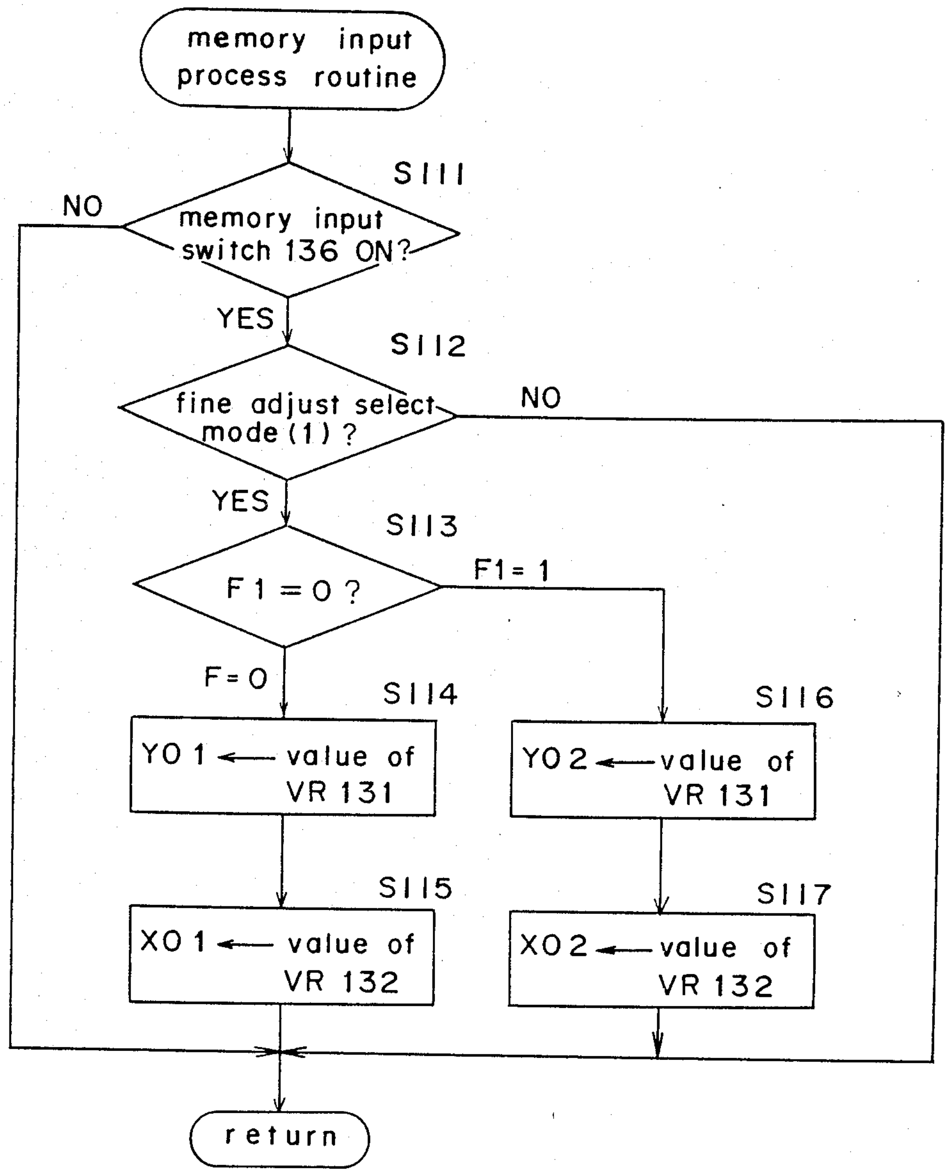
FIG. 13 is a flow chart of a memory input switch process routine.

FIG. 13 is a flow chart showing the memory input switch process routine. In the step S111, it is judged whether or not the memory input switch 136 is turned on. If the switch 136 is turned on, the program goes to the step S112 wherein it is judged the mode selected in the magnification adjusting process is (1), if the mode is (1), with YES, the program goes to the step S113. In the step S113, it is judged whether or not the flag F1 is [0], with the flag F1 [0], the value of the valuable resistor VR131 is stored in the area Y01 of the memory M01 for storing the adjusting value in the longitudinal direction as the fine adjusting value in the copy magnification in the longitudinal direction in the step S114, in the step S115, the value of the valuable resister VR132 is stored in the area X01 of the memory M01 for storing the adjusting value in the lateral direction as the fine adjusting value in the copy magnification in the lateral direction. If the flag F1 is [1] in the step S116, the value of the valuable resistor VR131 is stored in the area Y02 of the memory M02 as the fine adjusting value of the copy magnification in the longitudinal direction and in the step S117 the value of the valuable resistor 132 is stored in the area X02 of the memory M02 as the fine adjusting value of the copy magnification in the lateral direction.

As the memory input switch 137 a small push type switch which can, be operated by only the end of a ball pen is provided so as to avoid erroneous operation.

Figure 14:
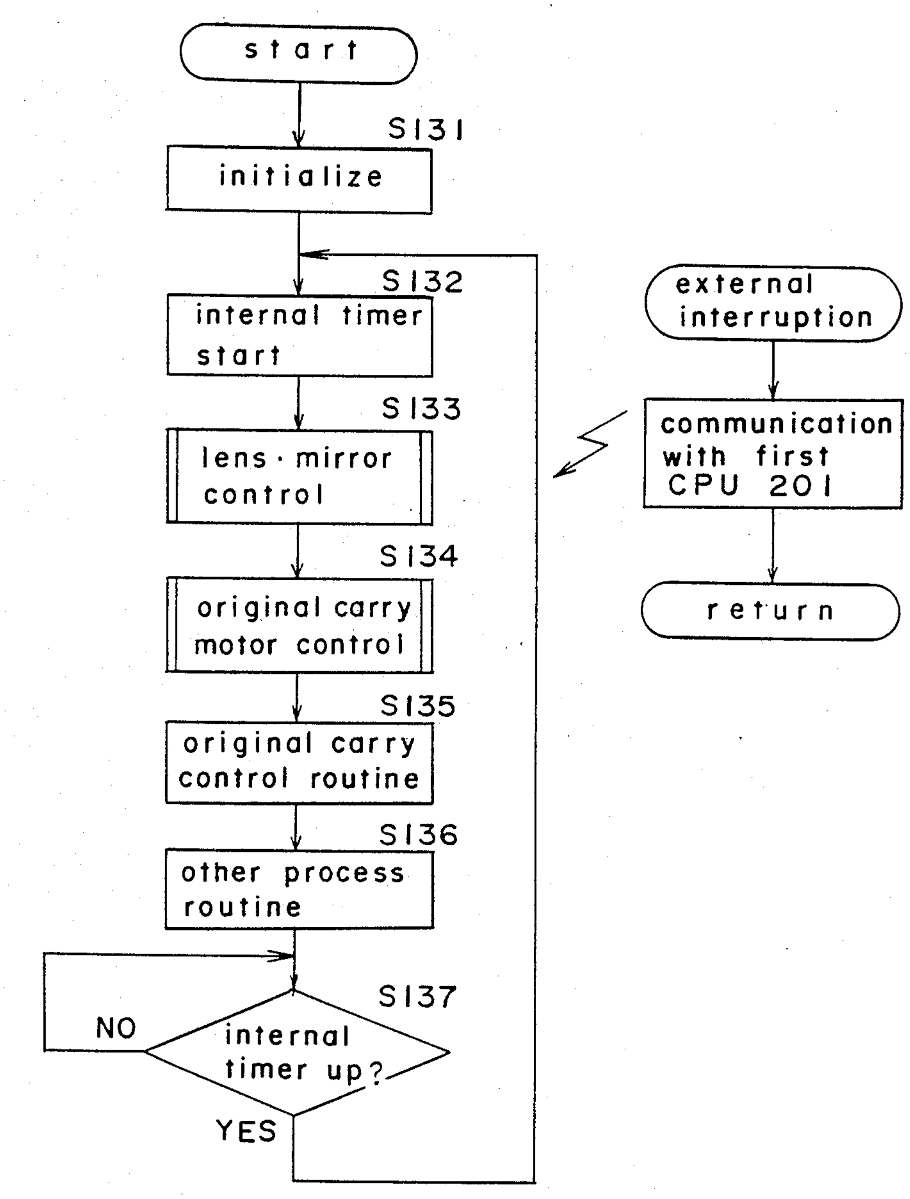
FIG. 14 is a flow chart of a main routine of CPU 21 and an external interruption routine.

FIG. 14 is a flow chart showing the main routine and external interruption of the second CPU 215.

In the step S131, the CPU 215 is initialized and the RAM is cleared with the registers set and the lens mirror is retracted to a standard position. In the step S132, the internal timer is started for setting the 1 routine time. In the step S133, lens mirror control routine is performed. In the step S134, the original document carrying motor control routine is performed, both routines are explained in detail later. In the step S135, original paper carrying control routine is performed. In the step S136, other routine is performed. In the step S137, whether or not the time set in the internal timer is up is judged, if the time is up, the program returns to the step S132, on the other hand, if the time is not up, the program waits.

The external interruption is used for the communication with the first CPU 201. The external interruption is performed by the interruption request from the first CPU 201 independent of the main routine.

Figure 15:
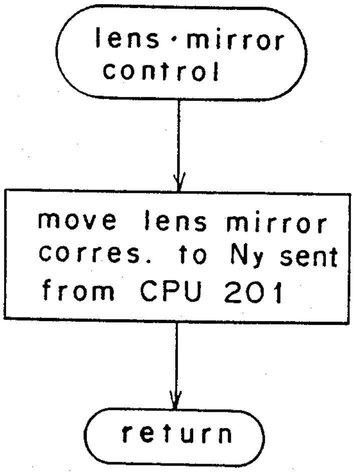
FIG. 15 is a flow chart of a lens mirror control routine.

FIG. 15 is a flow chart showing the lens mirror control routine. In the lens mirror control routine the stepping motor is driven according to the control value of the longitudinal copy magnification $N_Y = n(1+\Delta n_y)$ sent from the first CPU 201 through the bus 214 so that the lens 25 and the mirror 26 are moved in the light axis.

Figure 16:
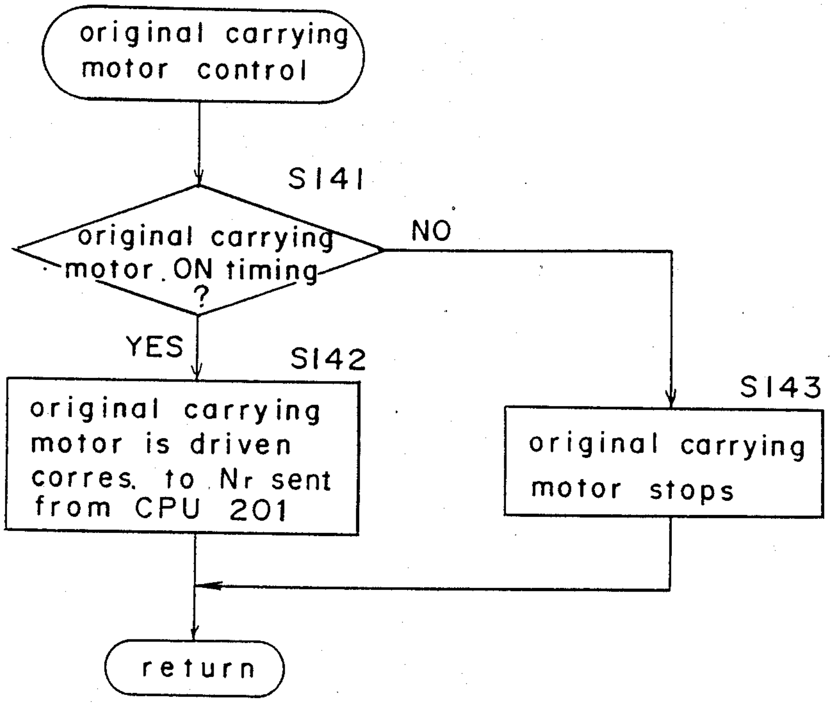
FIG. 16 is a flow chart of an original transferring motor control routine.

FIG. 16 is a flow chart showing the original carrying motor control routine.

In the step S141, it is judged whether or not the process is in the timing of ON (driving) the original carrying motor. If in the ON timing, with YES, the program goes to the step S142, the rotation speed of the original carrying motor M3 is controlled according to the copy magnification $N_T = n(1+\Delta n_t)$ sent from the first CPU 201 through the bus 214. If the judgement in the step S141 is NO, the program goes to the step S143 to stop the original carrying motor M3.

Although the adjusting value of the copy magnification in the longitudinal direction and the adjusting value of the copy magnification in the lateral direction are independently stored, they may be stored and read out in a pair.

It may be possible to increase the number of the memories to store the copy magnifications so as to use various kinds of the papers automatically.

According to the embodiment mentioned above, the copy magnification can be automatically modified by the adjusting values read from the memories corresponding to the kind of the copy paper which is discriminated by the discriminating means such as paper sensor, it is unnecessary to adjust the copy magnification in every copy so long as the size change of the copy paper is uniform, therefore, the operation of the fine adjusting the copy magnification can be made simple.

Modifications of the embodiment of the copying machine according to the present invention are explained hereinafter. It is noted that various arrangements and operations similar to those explained in the embodiment mentioned above are omitted.

Figure 17:
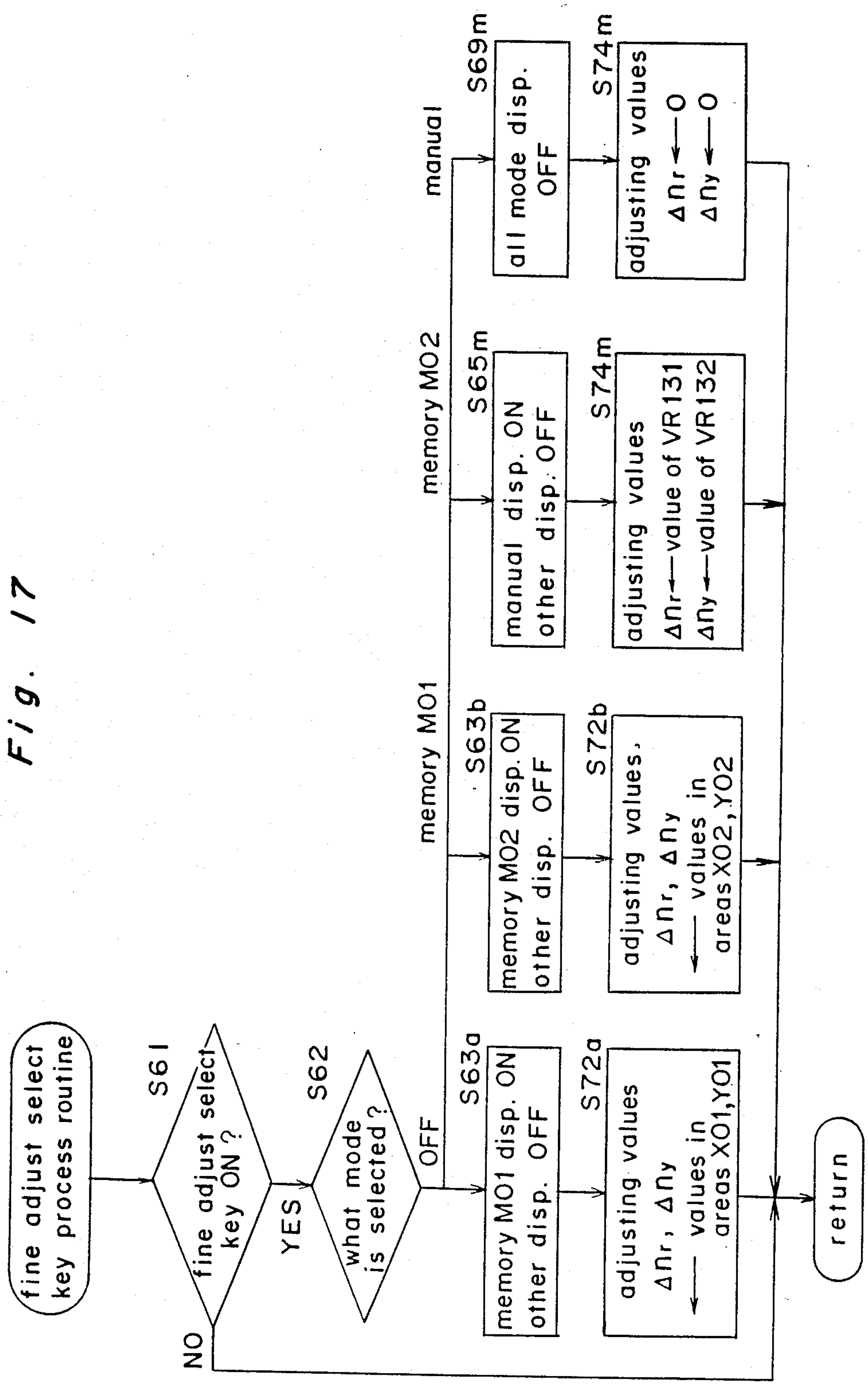
FIG. 17 is a flow chart of a modification of the fine adjust select key process routine.
Figure 18:
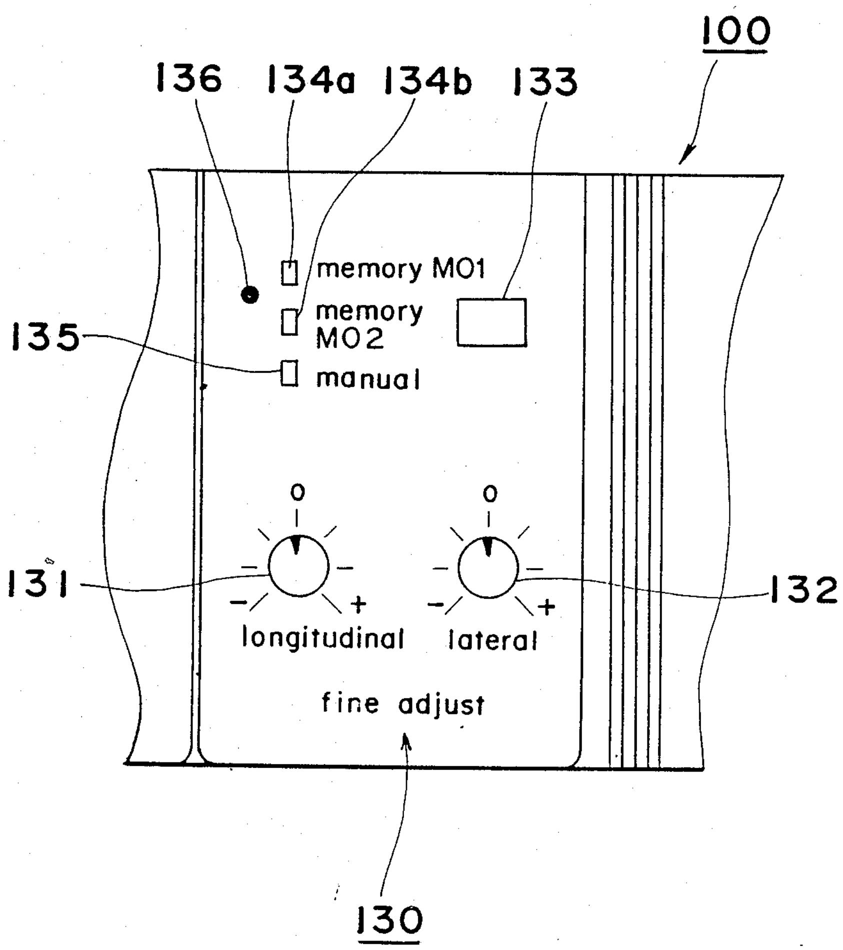
FIG. 18 is a top plan view of a modification of a part of the operation panel.

FIG. 17 shows a modification of the fine adjust select key process routine shown in FIG. 10. In the modification, there are four modes of a memory M01 selection mode, a memory M02 selection mode, a manual selection mode and an OFF mode. These modes are selected by the selection key 133 in a rotation manner. If the OFF mode is already set, upon operation of the key 133, the display 134*a* (see FIG. 18) for the memory M01 is turned on with the other displays 134*b* for the memory M02 and 135 for the manual operation turned off in the step S63*a* and the program goes to the step S74*a*, wherein the adjusting values in the longitudinal direction and the lateral direction stored in the memory M01 are set as the adjusting values $\Delta n_r$ and $\Delta n_y$. If the memory M01 selecting mode is already set, upon operation of the selection key 133, the display 134*b* for the memory M02 is turned on with the other displays 134*a* and 135 turned off and the program goes to the step S72*b* wherein the adjusting values stored in the memory M02 as the adjusting values $\Delta n_r$ and $\Delta n_y$. If the memory M02 mode is already set, the program goes to the step S65*m* to turn on the display 135 for the manual operation with the displays 134*a* and 134*b* turned off. Then the program goes to the step S74*m*, wherein the adjusting values set by the variable resistors VR131 and VR132 as the values $\Delta n_r$ and $\Delta n_y$. If the manual mode is already set, the program goes to the step S69*m* to turn off all displays 134*a*, 134*b* and 135 without setting the adjusting values in the longitudinal direction and the lateral direction in the step S74*m*.

In case where the magnification adjustment is not requested as in case of copying the normal original document, the OFF mode is selected. If the original is a drawing that is an exact copy in the size is requested, any one of the memory M01 mode, memory M02 mode or manual mode is selected.

It is convenient to preliminarily input in the memory M01 such adjusting values in the longitudinal and lateral directions for the copy using the normal copy paper and to preliminarily input in the memory M02 the adjusting values in the longitudinal direction and the lateral direction for the copy using tracing papers. With this arrangement, by performing the copy selecting the appropriate mode corresponding to the kind of the copy papers used for the copy, it is possible to make the copy with the desired exact size. The manual selection mode can be used for correcting the size of picture by making a copy of an original the picture size of which is not exact or for making a copy in which the picture size of the longitudinal direction and the lateral direction is unbalance by changing optionally the adjusting values in the longitudinal direction and the lateral direction.

Figure 19:
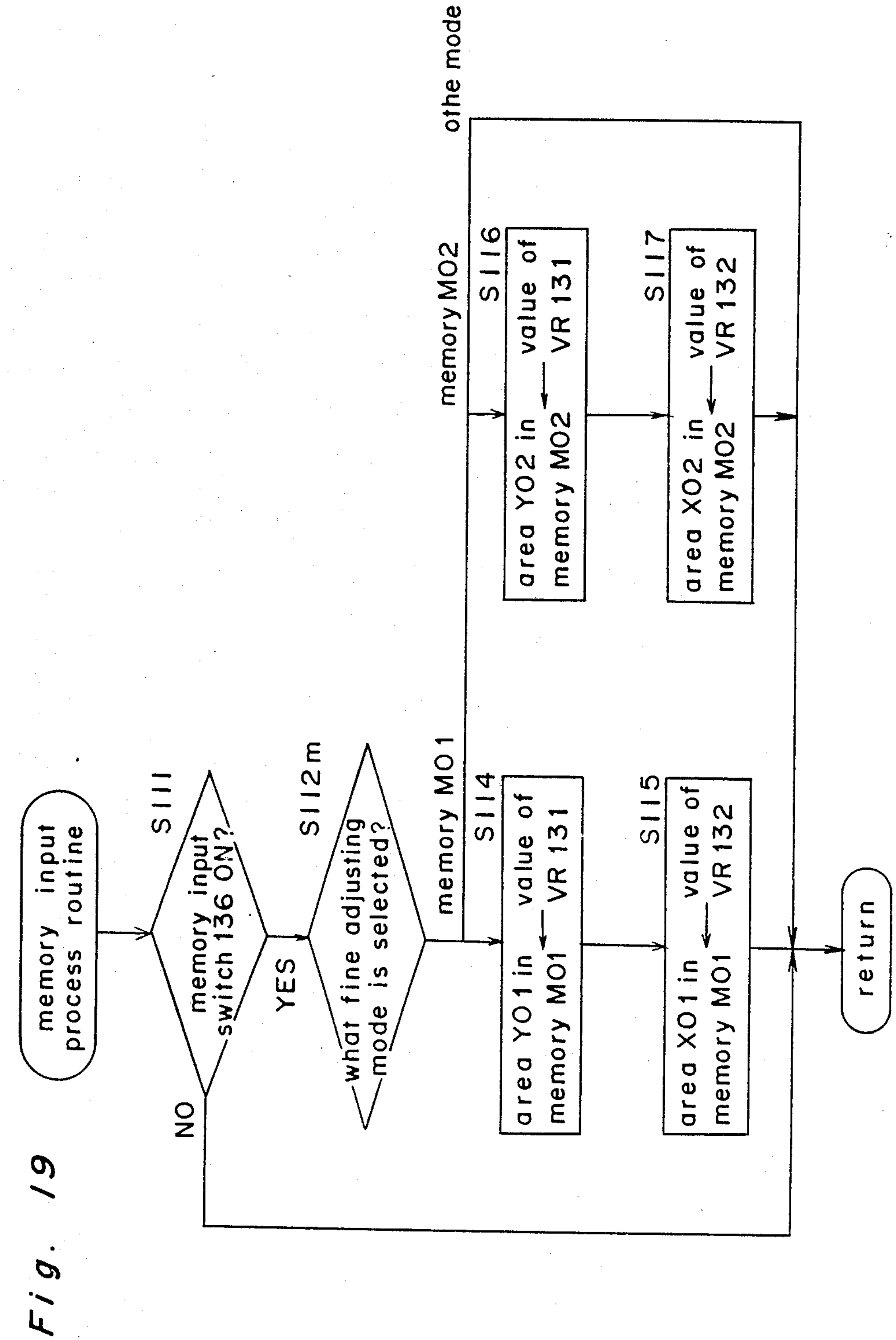
FIG. 19 is a flow chart of a modification of the memory input process routine.

FIG. 19 shows a modification of the memory input process routine for performing the modification shown in FIG. 17.

Referring to FIG. 19, in the step S112*m*, the mode presently set for the fine adjustment of the copy magnification is detected. If the memory M01 selection mode is set, the adjusting value set by the variable resistor VR131 is stored in the area Y01 of the memory M01 as the adjusting value of the copy magnification in the longitudinal direction in the step S114 and the adjusting value set by the variable resistor VR132 is stored in the area X01 of the memory M01 as the adjusting value of the copy magnification in the lateral direction in the step S115. If the memory M02 selection mode is set, the adjusting value set by the variable resistor VR131 is stored in the area Y02 of the memory M02 as the adjusting value of the copy magnification in the longitudinal direction in the step S116 and the adjusting value set by the variable resistor VR132 is stored in the area X02 of the memory M02 as the adjusting value of the copy magnification in the lateral direction. If the OFF mode or manual selection mode are set, the program returns to RETURN without updating the memories M01 and M02.

What is claimed is:

1. A copying machine comprising:

image forming means for forming an image of an original to be copied on a copying paper;

magnifying means for setting copy magnifications in a longitudinal direction and a lateral direction independently;

first selecting means for selecting any one of the copy magnifications preliminarily stored;

first magnification control means for controlling said magnifying means so that the copy of the original has such magnifications in the longitudinal and lateral directions as selected by said first selecting means;

a plurality of memory means each comprising memory areas for storing a pair of adjusting values for adjusting the copy magnifications, the pair of adjusting values being a first adjusting value in the longitudinal direction and a second adjusting value in the lateral direction;

second selecting means for selecting one of said memory means;

second magnification control means for controlling said magnifying means based on the pair of adjusting values stored in said selected memory means and the copy magnifications selected by said first selecting means;

whereby the copy magnification in the longitudinal direction is set based on the copy magnification selected by said first selecting means and the first adjusting value and the copy magnification in the lateral direction is set based on the copy magnification selected by said first selecting means and the second adjusting value.

2. The copying machine according to claim 1, further comprising input means for inputting a pair of adjusting values in said memory means.

3. The copying machine according to claim 2, wherein said inputting means comprises a variable resistor and an analog to digital converter for converting an analog signal generated by said variable resistor to a digital signal.

4. A copying machine comprising:

image forming means for forming an image of an original to be copied on a copying paper;

magnifying means for setting copy magnifications in a longitudinal direction and a lateral direction independently;

first selecting means for selecting any one of the copy magnifications preliminarily stored;

first magnification control means for controlling said magnifying means so that the copy of the original has such magnifications in the longitudinal and lateral directions as selected by said first selecting means;

memory means for storing a first adjusting value for adjusting the copy magnification in the longitudinal direction and a second adjusting value for adjusting the copy magnification in the lateral direction;

calling means for calling the first adjusting value and the second adjusting value;

second magnification control means for controlling said magnifying means based on the pair of adjusting values stored in said memory means and the copy magnifications selected by said first selecting means;

whereby the copy magnification in the longitudinal direction is set based on the copy magnification selected by said first selecting means and the first adjusting value and the copy magnification in the lateral direction is set based on the copy magnification selected by said first selecting means and the second adjusting value.

5. A copying machine comprising:

paper feeding means for feeding at least a copying paper;

paper kind discriminating means for discriminating the kind of the paper fed for copy;

image forming means for forming an image of an original to be copied on a copying paper;

magnifying means for setting copy magnifications in a longitudinal direction and a lateral direction independently;

first selecting means for selecting any one of the copy magnifications preliminarily stored;

first magnification control means for controlling said magnifying means to that the copy of the original has such magnifications in the longitudinal and lateral directions as selected by said first selecting means;

a plurality of memory means each comprising memory areas for storing a pair of adjusting values for adjusting the copy magnifications, the pair of adjusting values being a first adjusting value in the longitudinal direction and a second adjusting value in the lateral direction;

second selecting means for automatically selecting one of said memory means corresponding to the kind of the copy paper fed for copy;

second magnification control means for controlling said magnifying means based on the pair of adjusting values stored in said selected memory means and the copy magnifications selected by said first selecting means;

whereby the copy magnification in the longitudinal direction is set based on the copy magnification selected by said first selecting means and the first adjusting value and the copy magnification in the lateral direction is set based on the copy magnification selected by said first selecting means and the second adjusting value.

6. The copying machine according to claim 5, further comprising input means for inputting a pair of adjusting values in said memory means.

7. The copying machine according to claim 6, wherein said inputting means comprises a variable resistor and an analog to digital converter for converting an analog signal generated by said variable resistor to a digital signal.

8. The copying machine according to claim 5, wherein said paper feeding means comprises a plurality of paper feeding units and a selecting unit for selecting one of said paper feeding units and said paper discriminating means discriminates the kind of paper fed from said selected paper feeding unit.

9. A method of selection of copy magnifications in a copying machine in which the copying magnification can be set in a longitudinal direction and a lateral direction independently, said method comprising the steps of:

selecting one of the copy magnification preliminarily stored;

selecting one of memory means each of which stores a pair of adjusting values for adjusting the copy magnifications, the pair of adjusting values being a first adjusting value in the longitudinal direction and a second adjusting value in the lateral direction; and setting the copy magnification based on the pair of adjusting values stored in the memory means and the selected copy magnification;

whereby the copy magnification in the longitudinal direction is set based on the copy magnification selected by said first selecting means and the first adjusting value and the copy magnification in the lateral direction is set based on the copy magnification selected by said first selecting means and the second adjusting value.

10. A method of selection of copy magnification in a copying machine in which the copying magnification can be set in a longitudinal direction and a lateral direction independently, said method comprising the steps of:

selecting one of the copy magnifications preliminarily stored;

calling a first adjusting value for adjusting the copy magnification in the longitudinal direction and a second adjusting value for adjusting the copy magnification in the lateral direction from memory means storing the first adjusting value and the second adjusting value; and setting the copy magnification based on the called adjusting values and the selected copy magnification;

whereby the copy magnification in the longitudinal direction is based on the copy magnification selected by said first selecting means and the first adjusting value and the copy magnification in the lateral direction is set based on the copy magnification selected by said first selecting means and the second adjusting value.

11. A method of selection of copy magnification in a copying machine in which the copying magnification can be set in a longitudinal direction and a lateral direction independently, said method comprising the steps of:

selecting one of the copy magnifications preliminarily stored;

discriminating the kind of the copy paper fed for copy;

selecting one of memory means each of which stores a pair of adjusting values for adjusting the copy magnifications corresponding to the kind of the copying paper, each pair of adjusting values being a first adjusting value in the longitudinal direction and a second adjusting value in the lateral direction; and setting the copy magnification based on the pair of adjusting values stored in the selected memory means and the copy magnification, whereby the copy magnification in the longitudinal direction is set based on the copy magnification selected by said first selecting means and the first adjusting value and the copy magnification in the lateral direction is set based on the copy magnification selected by said first selecting means and the second adjusting value.

12. A copying machine comprising:

image forming means for forming an image of an original to be copied on a copying paper;

magnifying means for setting copy magnifications;

first selecting means for selecting any one of the copy magnifications preliminarily stored;

first magnification control mans for controlling said magnifying means based on th ecopy magnification selected by said first selecting means;

a plurality of memory means each comprising memory areas for storing adjusting values for adjusting the copy magnifications;

second selecting means for selecting one of said memory means; and second magnification control means for controlling said magnifying means based on the adjusting values stored in said selected memory means and the copy magnifications selected by said first selecting means.

13. A copying machine comprising:
paper feeding means for feeding at least a copying paper;
paper kind discriminating means for discriminating the kind of the paper fed for copying;
image forming means for forming an image of an original to be copied on a copying paper;
magnifying means for setting copy magnification in a longitudinal direction and a lateral direction independently;
first selecting means for selecting any one of the copy magnifications preliminarily stored;
first magnification control means for controlling said magnifying means based on the copy magnification selected by said first selecting means;
a plurality of memory means each comprising memory areas for storing adjusting values for adjusting the copy magnifications,
second selecting means for automatically selecting one of said memory means corresponding to the kind of the copy paper fed for copying; and
second magnification control means for controlling said magnifying means based on the adjusting values stored in said selected memory means and the copy magnifications selected by said first selecting means.

14. A method of selection of copy magnifications in a copying machine, said method comprising the steps of:
selecting one of the copy magnifications preliminarily stored;
selecting one of memory means each of which stores adjusting values for adjusting the copy magnifications; and
setting the copy magnification based on the adjusting values stored in the memory means and the selected copy magnification.

15. A method of selection of copy magnifications in a copying machine, said method comprising the steps of:
selecting one of the copy magnifications preliminarily stored;
discriminating the kind of the copy paper fed for copying;
selecting one of memory means each of which stores adjusting values for adjusting the copy magnifications corresponding to the kind of the copying paper; and
setting the copy magnification based on the adjusting values stored in the selected memory means and the copy magnification.

* * * * *

UNITED STATES PATENT AND TRADEMARK OFFICE
CERTIFICATE OF CORRECTION

PATENT NO. : 4,959,684

DATED : September 25, 1990

INVENTOR(S) : Hideo Ito

It is certified that error appears in the above-identified patent and that said Letters Patent is hereby corrected as shown below:

In col. 2, line 19, change "ar" to --are--.

In col. 3, line 54, change "lens" to --lenses--.

In col. 5, line 52, change "a" to --as--.

In col. 6, line 34, change "sensor" to --sensors--.

In col. 6, line 38, delete "with the".

In col. 8, line 43, before "program", insert --the--.

In col. 8, line 56, before "with", insert --,-- (comma).

In col. 9, line 58, after "can", delete "," (comma).

UNITED STATES PATENT AND TRADEMARK OFFICE

CERTIFICATE OF CORRECTION

PATENT NO. : 4,959,684

DATED : September 25, 1990

INVENTOR(S) : Hideo Ito

It is certified that error appears in the above-identified patent and that said Letters Patent is hereby corrected as shown below:

In col. 13, line 55 (claim 9, line 6), change "magnification" to --magnifications--.

In col. 14, line 5 (claim 10, line 1), change "magnification" to --magnifications--.

In col. 14, line 28 (claim 11, line 1), change "magnification" to --magnifications--.

In col. 14, line 61 (claim 12, line 7), change "mans" to --means--.

In col. 14, line 62 (claim 12, line 8), change "th ecopy" to --the copy--.

Signed and Sealed this

Sixteenth Day of June, 1992

*Attest:*

DOUGLAS B. COMER

*Attesting Officer*

*Acting Commissioner of Patents and Trademarks*